United States Patent
Lin et al.

(10) Patent No.: US 10,390,299 B2
(45) Date of Patent: Aug. 20, 2019

(54) ACCESS METHOD AND DEVICE IN HETEROGENEOUS NETWORK

(71) Applicant: China Academy of Telecommunications Technology, Beijing (CN)

(72) Inventors: Lin Lin, Beijing (CN); Shanzhi Chen, Beijing (CN); Weiguo Ma, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 52 days.

(21) Appl. No.: 15/502,775

(22) PCT Filed: Jul. 28, 2015

(86) PCT No.: PCT/CN2015/085310
§ 371 (c)(1),
(2) Date: Feb. 8, 2017

(87) PCT Pub. No.: WO2016/019819
PCT Pub. Date: Feb. 11, 2016

(65) Prior Publication Data
US 2017/0238246 A1   Aug. 17, 2017

(30) Foreign Application Priority Data
Aug. 8, 2014   (CN) .......................... 2014 1 0389810

(51) Int. Cl.
*H04W 16/32*   (2009.01)
*H04W 48/06*   (2009.01)
(Continued)

(52) U.S. Cl.
CPC .......... *H04W 48/20* (2013.01); *H04W 16/32* (2013.01); *H04W 48/06* (2013.01); *H04W 48/18* (2013.01); *H04W 74/00* (2013.01); *H04W 88/06* (2013.01)

(58) Field of Classification Search
CPC ..... H04W 16/32; H04W 48/06; H04W 48/20; A63F 13/216; A63F 13/235; G01S 5/14
See application file for complete search history.

(56) References Cited

U.S. PATENT DOCUMENTS 7,620,370 B2 * 11/2009 Barak .................. H04W 16/10
                                                  370/480
8,311,539 B2   11/2012 Luo et al.
(Continued)

FOREIGN PATENT DOCUMENTS

CN    101505540 A    8/2009
CN    101778114 A    7/2010
(Continued)

OTHER PUBLICATIONS

Kimaya Mittal et al.. base on 1999 Ph.D. Thesis, A Game-Theoretic Analysis of Wireless Access Point Selection by Mobile Users, Citrix Online, 6500 Hollister Avenue, Goleta, CA, 93117.*

*Primary Examiner* — Ayaz R Sheikh
*Assistant Examiner* — Debebe A Asefa
(74) *Attorney, Agent, or Firm* — Kilpatrick Townsend & Stockton LLP

(57) ABSTRACT

Disclosed are an access method and device in a heterogeneous network for solving the problem that, in network selection of a heterogeneous wireless network, a user can only enjoy at any one time the service of one network and cannot simultaneously enjoy the services of different networks, the method comprising: dividing access points capable of providing a service for a user equipment (UE) into at least one competition group; and determining the
(Continued)

access overhead of the competition group, and selecting for the UE, according to the determined access overhead of the competition group, a target competition group from the competition groups for accessing. A network multi-path routing and traffic distribution model is established, such that the UE can select different access methods, thus providing a new traffic operation mode for network development.

20 Claims, 5 Drawing Sheets

(51) Int. Cl.
*H04W 48/18* (2009.01)
*H04W 48/20* (2009.01)
*H04W 74/00* (2009.01)
*H04W 88/06* (2009.01)

(56) References Cited

U.S. PATENT DOCUMENTS

| | | | |
|---|---|---|---|
| 8,344,949 B2* | 1/2013 | Moshfeghi | G01S 5/0263 342/457 |
| 2010/0017861 A1 | 1/2010 | Krishnaswamy et al. | |
| 2012/0058742 A1 | 3/2012 | Razoumov et al. | |
| 2012/0238287 A1 | 9/2012 | Scherzer | |

FOREIGN PATENT DOCUMENTS

| | | |
|---|---|---|
| CN | 101909326 A | 12/2010 |
| CN | 102100112 A | 6/2011 |
| CN | 103096440 A | 5/2013 |
| CN | 104219782 A | 12/2014 |
| JP | 2006504291 A | 2/2006 |
| JP | 2012109742 A | 6/2012 |
| JP | 2014509489 A | 4/2014 |
| WO | 2012106847 A1 | 8/2012 |
| WO | 2013163745 A1 | 11/2013 |

* cited by examiner

ACCESS METHOD AND DEVICE IN HETEROGENEOUS NETWORK

CROSS-REFERENCE TO RELATED APPLICATIONS

This application is a National Stage of International Application No. PCT/CN2015/085310, filed Jul. 28, 2015, which claims the benefit and priority of Chinese Patent Application No. 201410389810.0, filed Aug. 8, 2014, both of which are hereby incorporated by reference in their entireties.

FIELD

The present invention relates to the field of communications, and particularly to an accessing method and apparatus in a heterogeneous network.

BACKGROUND

As new Radio Access Technologies (RATs), e.g., the cellular network radio technology, the Wireless Fidelity (WiFi) access technology, etc., are constantly emerging, such a wireless communication network setup has emerged that there are a number of radio access technologies coexisting. At present, there are a number of network operators serving their users, and from the perspective of the users, there are separate market shares of the network operators due to their monopolized and exclusive market shares, and the uni-mode characteristic of user equipments. As multi-mode user equipments are emerging, there are overlapping market shares of the network operators for their users, and the policy of carrying a photo number from one network to another has been issued so that a market share is allowed to be transferred from one network operator to another.

From the perspective of a service, only one operator is currently selected for the same service of a user, so that the operator may offload traffic of a 3G network to its own WiFi network dependent upon the traffic of the service, and the capacity of the network, but there are no different operators in a cooperative relationship for the same service, thus greatly preventing the user, particularly with a highly mobile on-vehicle user equipment, from select freely between the operators. Moreover the network operators typically enforce their fixed charging rules, so that even if there are different applicable charging modes of service packages corresponding to different services, then it may not be possible for each user to select his or her own desirable charging mode and corresponding quality of service.

The future trend of the network services shall be such a dynamic pricing mode that the different operators may provide different access services concurrently for the same traffic, and compete for the traffic while they are cooperating with each other. In this way, the users can select freely their desirable ones of the operators; and the operators can compete at a finer granularity, so that the services of the operators will be further improved, and the operators can also avoid their deployments from being repeated, thus lowering their deployment costs, and also extending their shares in the market.

In summary, in order to select an access network for the heterogeneous wireless network in the prior art, the most appropriate access network is selected primarily for the real demand of a user (for a service), so that the user (service) can only be served by that network at any time instead of being served concurrently by different networks, thus restricting the freedom of the user to select between the networks, which may discourage the experience of the user.

SUMMARY

The invention discloses an accessing method and apparatus in a heterogeneous network so as to address the problem that such a network is selected for the heterogeneous wireless network that the user can only be served by that network at any time instead of being served concurrently by different networks.

Some embodiments of the invention provide an accessing method in a heterogeneous network, the method includes:
grouping access points, which can serve a user equipment, into at least one competing group; and
determining an access overhead of the competing group, and selecting a target competing group for the accessing user equipment from the competing group according to determined access overhead.

Optionally grouping the access points, which can serve the user equipment, into the at least one competing group includes:
grouping the access points, which can serve the user equipment, into the at least one competing group under such a principle that access points served by the same operator do not compete with each other, wherein respective access points served by the same operator are grouped into different competing groups; or
grouping the access points, which can serve the user equipment, into the at least one competing group under such a principle that access points which are operating with the same access technology and served by the same operator do not compete with each other, wherein respective access points which are operating with the same access technology and served by the same operator are grouped into different competing groups; or
grouping the access points, which can serve the user equipment, into the at least one competing group under such a principle that access points in a preset distance range do not compete with each other, wherein the respective access points in the preset distance range are grouped into different competing groups; or
grouping the access points, which can serve the user equipment, into the at least one competing group under such a principle that access points operating with the same access technology do not compete with each other, wherein respective access points operating with the same access technology are grouped into different competing groups; or
grouping the access points, which can serve the user equipment, into the at least one competing group under such a principle that access points where a difference between currently available access rates of each of the access points are above a preset threshold, do not compete with each other, wherein the access points where a difference between currently available access rates of each of the access points are above the preset threshold, are grouped into different competing groups; or
grouping the access points, which can serve the user equipment, into the at least one competing group under such a principle that access points, which can currently provide such access rates that a difference between each of the access rates and a preset access rate reference value lies in a preset threshold range, shall compete with each other, wherein the access points, which can currently provide such access rates that a difference between each of the access rates and the preset access rate reference value lies in the preset threshold range are grouped into the same competing group; or grouping randomly the access points, which can serve the user equipment, into the at least one competing group.

Optionally before the access overhead of the competing group is determined, the method further includes: for each competing group, determining access rates to be provided for the user equipment by the respective access points in the competing group respectively, and if all the access rates currently available from the respective access points in the competing group are equal to or greater than the access rates to be provided for the user equipment by the respective access points, then determining the competing group as a pre-selected competing group; and determining the access overhead of the competing group, and selecting the target competing group for the accessing user equipment from the competing group according to the determined access overhead includes: determining an access overhead of each pre-selected competing group, and selecting the target competing group for the accessing user equipment from the pre-selected competing groups according to the determined access overheads.

Furthermore the method further includes:

for each competing group, if the access rate currently available from at least one access point in the competing group is less than the access rate to be provided for the user equipment by the access point, then discarding the competing group.

Optionally for each competing group, determining the access rates to be provided for the user equipment by the respective access points in the competing group respectively includes:

for each competing group, determining the access rates to be provided for the user equipment by the respective access points in the competing group respectively under such a principle that net gains of the respective access points in the competing group are maximized.

Optionally for each competing group, the access rates to be provided for the user equipment by the respective access points in the competing group are determined respectively in the following differential gaming model:

$$\begin{cases} \text{Max}\left[\int_0^\infty \left\{\frac{1}{h_i}P(s)v_i(s) - (v_i(s)^2 b_i + v_i(s)c_i)\right\}e^{-rs}ds\right] \\ \dot{P}(s) = k\left[a - \sum_{i=1}^n v_i(s) - P(s)\right] \end{cases};$$

wherein $P(s)$ represents a gain of unit information of the competing group at an instance s of time; $\dot{P}(s)$ represents a derivation operation on $P(s)$; $v_i(s)$ represents an access rate to be provided for the user equipment by the i-th access point in the pre-selected competing group at the instance s of time, wherein $i=1, 2, \ldots, n$, and n represents the number of access points in the pre-selected competing group; $h_i$ represents the number of hops between the user equipment, and the i-th access point in the pre-selected competing group; r represents a discount rate; and $v_i(s)^2 b_i + v_i(s)c_i$ represents the cost of the i-th access point, wherein $b_i$ and $c_i$ represents preset coefficients.

Further to any one of the embodiments above, determining the access overhead of the competing group includes:

determining the access overhead of each competing group according to a gain of unit information of the competing group, and access rates to be provided for the user equipment by the respective access points in the competing group.

Further to any one of the embodiments above, the access overhead of each competing group is determined in the equation of:

$$\sum_{i=1}^n \int_0^\infty P(s)v_i(s)ds;$$

wherein $P(s)$ represents a gain of unit information of the competing group at an instance s of time; and $v_i(s)$ represents an access rate available from the i-th access point in the competing group at the instance s of time, wherein $i=1, 2, \ldots, n$, and n represents the number of access points in the competing group.

Further to any one of the embodiments above, selecting the target competing group for the accessing user equipment from the competing group according to the determined access overhead further includes:

selecting the target competing group for the accessing user equipment from the competing group according to a demand of the user equipment for a network quality of an access network.

Some embodiments of the invention provide an accessing apparatus in a heterogeneous network, the apparatus includes:

a grouping module configured to group access points, which can serve a user equipment, into at least one competing group; and a processing module configured to determine an access overhead of the competing group, and to select a target competing group for the accessing user equipment from the competing group according to determined access overhead.

Optionally the grouping module is configured:

to group the access points, which can serve the user equipment, into the at least one competing group under such a principle that access points served by the same operator do not compete with each other, wherein respective access points served by the same operator are grouped into different competing groups; or to group the access points, which can serve the user equipment, into the at least one competing group under such a principle that access points which are operating with the same access technology and served by the same operator do not compete with each other, wherein respective access points which are operating with the same access technology and served by the same operator are grouped into different competing groups; or to group the access points, which can serve the user equipment, into the at least one competing group under such a principle that access points in a preset distance range do not compete with each other, wherein the respective access points in the preset distance range are grouped into different competing groups; or to group the access points, which can serve the user equipment, into the at least one competing group under such a principle that access points operating with the same access technology do not compete with each other, wherein respective access points operating with the same access technology are grouped into different competing groups; or to group the access points, which can serve the user equipment, into the at least one competing group under such a principle that access points where a difference between currently available access rates of each of the access points are above a preset threshold, do not compete with each other, wherein the access points where a difference between currently available access rates of each of the access points are above the preset threshold, are grouped into different competing groups; or to group the access points, which can serve the user equipment, into the at least one competing group under such a principle that access points, which can currently provide such access rates that a difference between each of the access rates and a preset access rate reference value lies in a preset threshold range, shall compete with each other, wherein the access points, which can currently provide such access rates that a difference between each of the access rates and the preset access rate reference value lies in the preset threshold range are grouped into the same competing group; or to group randomly the access points, which can serve the user equipment, into the at least one competing group.

Optionally the processing module is configured:

for each competing group, to determine access rates to be provided for the user equipment by the respective access points in the competing group respectively, and if all the access rates currently available from the respective access points in the competing group are equal to or greater than the access rates to be provided for the user equipment by the respective access points, to determine the competing group as a pre-selected competing group; and to determine an access overhead of each pre-selected competing group, and to select the target competing group for the accessing user equipment from the pre-selected competing group according to the determined access overhead.

Furthermore the processing module is further configured:

for each competing group, if the access rate currently available from at least one access point in the competing group is less than the access rate to be provided for the user equipment by the access point, to discard the competing group.

Furthermore the processing module is configured:

for each competing group, to determine the access rates to be provided for the user equipment by the respective access points in the competing group respectively under such a principle that net gains of the respective access points in the competing group are maximized.

Optionally for each competing group, the processing module is configured to determine the access rates to be provided for the user equipment by the respective access points in the competing group respectively in the following differential gaming model:

$$\begin{cases} \text{Max}\left[\int_0^\infty \left\{\frac{1}{h_i}P(s)v_i(s) - (v_i(s)^2 b_i + v_i(s)c_i)\right\}e^{-rs}ds\right] \\ P(s) = k\left[a - \sum_{i=1}^n v_i(s) - P(s)\right] \end{cases};$$

wherein P(s) represents a gain of unit information of the competing group at an instance s of time; $\dot{P}(s)$ represents a derivation operation on P(s); $v_i(s)$ represents an access rate to be provided for the user equipment by the i-th access point in the pre-selected competing group at the instance s of time, wherein i=1, 2, ..., n, and n represents the number of access points in the pre-selected competing group; $h_i$ represents the number of hops between the user equipment, and the i-th access point in the pre-selected competing group; r represents a discount rate; and $v_i(s)^2 b_i + (s)c_i$ represents the cost of the i-th access point, wherein $b_i$ and $c_i$ represents preset coefficients.

Further to any one of the embodiments above, the processing module is configured to determine the access overhead of the competing group by:

determining the access overhead of each competing group according to a gain of unit information of the competing group, and access rates to be provided for the user equipment by the respective access points in the competing group.

Further to any one of the embodiments above, the processing module is configured to determine the access overhead of the competing group in the equation of:

$$\sum_{i=1}^n \int_0^\infty P(s)v_i(s)ds;$$

wherein P(s) represents a gain of unit information of the competing group at an instance s of time; and $v_i(s)$ represents an access rate available from the i-th access point in the competing group at the instance s of time, wherein i=1, 2, ..., n, and n represents the number of access points in the competing group.

Further to any one of the embodiments above, the processing module is further configured:

to select the target competing group for the accessing user equipment from the competing group according to a demand of the user equipment for a network quality of an access network.

Some embodiments of the invention provide a communicating device including a transceiver, and at least one processor connected with the transceiver, wherein:

the transceiver is configured to communicate data with another device; and the processor is configured to group access points, which can serve a user equipment, into at least one competing group; and to determine an access overhead of the competing group, and to select a target competing group for the accessing user equipment from the competing group according to determined access overhead.

Optionally the processor is configured:

to group the access points, which can serve the user equipment, into the at least one competing group under such a principle that access points served by the same operator do not compete with each other, wherein respective access points served by the same operator are grouped into different competing groups; or to group the access points, which can serve the user equipment, into the at least one competing group under such a principle that access points which are operating with the same access technology and served by the same operator do not compete with each other, wherein respective access points which are operating with the same access technology and served by the same operator are grouped into different competing groups; or to group the access points, which can serve the user equipment, into the at least one competing group under such a principle that access points in a preset distance range do not compete with each other, wherein the respective access points in the preset distance range are grouped into different competing groups; or to group the access points, which can serve the user equipment, into the at least one competing group under such a principle that access points operating with the same access technology do not compete with each other, wherein respective access points operating with the same access technology are grouped into different competing groups; or to group the access points, which can serve the user equipment, into the at least one competing group under such a principle that access points where a difference between currently available access rates of each of the access points are above a preset threshold, do not compete with each other, wherein the access points where a difference between currently available access rates of each of the access points are above the preset threshold, are grouped into different competing groups; or to group the access points, which can serve the user equipment, into the at least one competing group under such a principle that access points, which can currently provide such access rates that a difference between each of the access rates and a preset access rate reference value lies in a preset threshold range, shall compete with each other, wherein the access points, which can currently provide such access rates that a difference between each of the access rates and the preset access rate reference value lies in the preset threshold range are grouped into the same competing group; or to group randomly the access points, which can serve the user equipment, into the at least one competing group.

Optionally the processor is configured:

for each competing group, to determine access rates to be provided for the user equipment by the respective access points in the competing group respectively, and if all the access rates currently available from the respective access points in the competing group are equal to or greater than the access rates to be provided for the user equipment by the respective access points, to determine the competing group as a pre-selected competing group; and to determine an access overhead of each pre-selected competing group, and to select the target competing group for the accessing user equipment from the pre-selected competing groups according to the determined access overheads.

Furthermore the processor is further configured:

for each competing group, if the access rate currently available from at least one access point in the competing group is less than the access rate to be provided for the user equipment by the access point, to discard the competing group.

Optionally the processor is configured:

for each competing group, to determine the access rates to be provided for the user equipment by the respective access points in the competing group respectively under such a principle that net gains of the respective access points in the competing group are maximized.

Optionally for each competing group, the processor is configured to determine the access rates to be provided for the user equipment by the respective access points in the competing group respectively in the following differential gaming model:

$$\begin{cases} \text{Max}\left[ \int_0^\infty \left\{ \frac{1}{h_i} P(s) v_i(s) - (v_i(s)^2 b_i + v_i(s) c_i) \right\} e^{-rs} ds \right] \\ \dot{P}(s) = k\left[ a - \sum_{i=1}^n v_i(s) - P(s) \right] \end{cases};$$

wherein $P(s)$ represents a gain of unit information of the competing group at an instance s of time; $\dot{P}(s)$ represents a derivation operation on $P(s)$; $v_i(s)$ represents an access rate to be provided for the user equipment by the i-th access point in the pre-selected competing group at the instance s of time, wherein i=1, 2, . . . , n, and n represents the number of access points in the pre-selected competing group; $h_i$ represents the number of hops between the user equipment, and the i-th access point in the pre-selected competing group; r represents a discount rate; and $v_i(s)^2 b_i + v_i(s) c_i$ represents the cost of the i-th access point, wherein $b_i$ and $c_i$ represents preset coefficients.

Further to any one of the embodiments above, the processor configured to determine the access overhead of the competing group is configured:

to determine the access overhead of each competing group according to a gain of unit information of the competing group, and access rates to be provided for the user equipment by the respective access points in the competing group.

Further to any one of the embodiments above, the processor is configured to determine the access overhead of the competing group in the equation of:

$$\sum_{i=1}^n \int_0^\infty P(s) v_i(s) ds;$$

wherein $P(s)$ represents a gain of unit information of the competing group at an instance s of time; and $v_i(s)$ represents an access rate available from the i-th access point in the competing group at the instance s of time, wherein i=1, 2, . . . , n, and n represents the number of access points in the competing group.

Further to any one of the embodiments above, the processor is further configured:

to select the target competing group for the accessing user equipment from the competing group according to a demand of the user equipment for a network quality of an access network.

The embodiments of the invention provide a solution to competing for traffic in a heterogeneous network so as to extend the mode in which the same service can only be served by one operator at the same time in the prior art, so that a user equipment can select different access schemes, thus providing a new traffic operating mode for the development of the network.

DETAILED DESCRIPTION OF THE EMBODIMENTS

Figure 1:
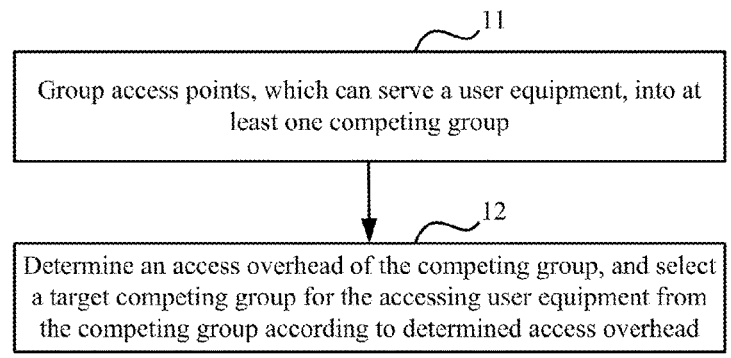
FIG. 1 is a schematic flow chart of a first accessing method in a heterogeneous network according to the invention.

In order to make the objects, technical solutions, and advantages of the embodiments of the invention more apparent, the technical solutions according to the embodiments of the invention will be described below clearly and fully with reference to the drawings in the embodiments of the invention, and apparently the embodiments described below are only a part but not all of the embodiments of the invention. Based upon the embodiments here of the invention, all the other embodiments which can occur to those ordinarily skilled in the art without any inventive effort shall fall into the scope of the invention.

It shall be appreciated that the technical solutions according to the invention can be applicable to various communication systems, e.g., a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced Long Term Evolution (LTE-A) system, a Universal Mobile Telecommunication System (UMTS) system, etc.

It shall be further appreciated that in the embodiments of the invention, a User Equipment (UE) includes but will not be limited to a Mobile Station (MS), a Mobile Terminal (MT), a mobile telephone, a handset, a portable equipment, etc., where the user equipment can communicate with one or more core network over a Radio Access Network (RAN), for example, the user equipment can be a mobile telephone (or referred to as a "cellular" telephone), a computer with a wireless communication function, etc., and the user equipment can further be a portable, a miniaturized, a hand-held, a built-in-computer or on-vehicle mobile device, etc.

In embodiments of the invention, a base station (e.g., an access point) can refer to a device communicating with a wireless terminal in one or more sectors via an air interface in an access network. The base station acting as a router between the wireless terminal, and the remaining components of the access network can be configured to convert a received frame over the air into an IP packet, or vice versa, where the remaining components of the access network can include an Internet Protocol (IP) network. The base station can further coordinate attribute management on the air interface. For example, the base station can be a Base Transceiver Station (BTS) in the GSM or CDMA system, or can be a NodeB in the WCDMA system, or can be an evolved Node B (NodeB or eNB or eNodeB) in the LTE system, although the invention will not be limited thereto.

In the invention, a plurality of access points are selected for the accessing user equipment based upon access rates to be provided by the respective access points for the user equipment, and access rates currently available from the access points, so that respective operators cooperate cooperatively for the user using their access technologies without wasting the existing communication infrastructure.

The embodiments of the invention will be described below in further details with reference to the drawings. It shall be appreciated that the embodiments described are merely intended to illustrate and describe the invention, but not to limit the invention.

In order to enable the different operators to provide different access services concurrently for the same service so as to enable the user to select freely his or her own desirable access point, firstly such a feasible competition mechanism that the competition for traffic appears to the user equipment as the selection of an access point and an access rate, i.e., the competition for traffic in a heterogeneous network. The embodiments of the invention provide such a solution to competition for traffic in a heterogeneous network that the operators can compete cooperatively through dynamic pricing at a fine competition granularity up to the traffic so as to extend the mode in which the same service can only be served by one operator at the same time in the prior art, so that the user equipment can select different access schemes, thus providing a new traffic operating mode for the development of the network, particularly an Internet of vehicles system where there are a high movement speed of the vehicles.

FIG. 1 illustrates a first accessing method in a heterogeneous according to some embodiments of the invention, and as illustrated in FIG. 1, the method includes the following steps:

The step 11 is to group access points, which can serve a user equipment, into at least one competing group.

In this step, the access points which can serve the user equipment are grouped into at least one group, each of which is referred to as a competing group in which there is at least one access point which can serve the user equipment.

The step 12 is to determine an access overhead of the competing group, and to select a target competing group for the accessing user equipment from the competing group according to the determined access overhead.

In this step, the target competing group is determined for the accessing user equipment from the competing group according to the determined access overhead, where the selected competing group is defined as a target competing group, and the user equipment can access each access point in the target competing group.

In the embodiment of the invention, firstly the access points which can serve the user equipment are grouped into the at least one competing group; and then the access overhead of the competing group is determined, and the target competing group is determined for the accessing user equipment from the competing group according to the determined access overhead, thus providing such a solution to competition for traffic in a heterogeneous network that the operators can compete cooperatively through dynamic pricing at a fine competition granularity up to the traffic so as to extend the mode in which the same service can only be served by one operator at the same time in the prior art, so that the user equipment can select different access schemes, thus providing a new traffic operating mode for the development of the network.

In some embodiments, before the step 11, the method further includes creating a heterogeneous network model, that is, determining the access points in the heterogeneous network, which can serve the user equipment.

Taking an Internet of vehicles system as an example, an on-vehicle terminal in the Internet of vehicles system may reside concurrently in the heterogeneous network including a cellular network, a WiFi network, and a wireless ad hoc network. The three networks with their respective advantages functionally supplement each other. The ad network including the vehicles can be architecturally understood as supplementation to a radio access network, and some nodes in the ad hoc network in the network model can be regarded as access points, where these nodes can act as forwarding nodes of radio access points. The heterogeneous network model can be created by determining access points, which can serve the on-vehicle terminal, in the cellular network, the WiFi network, and the wireless ad hoc network.

Optionally the access points can be grouped in the step 11 by grouping all the access points in the heterogeneous network, which can serve the user equipment, or a subset of the access points in the heterogeneous network, which can serve the user equipment.

Figure 2:
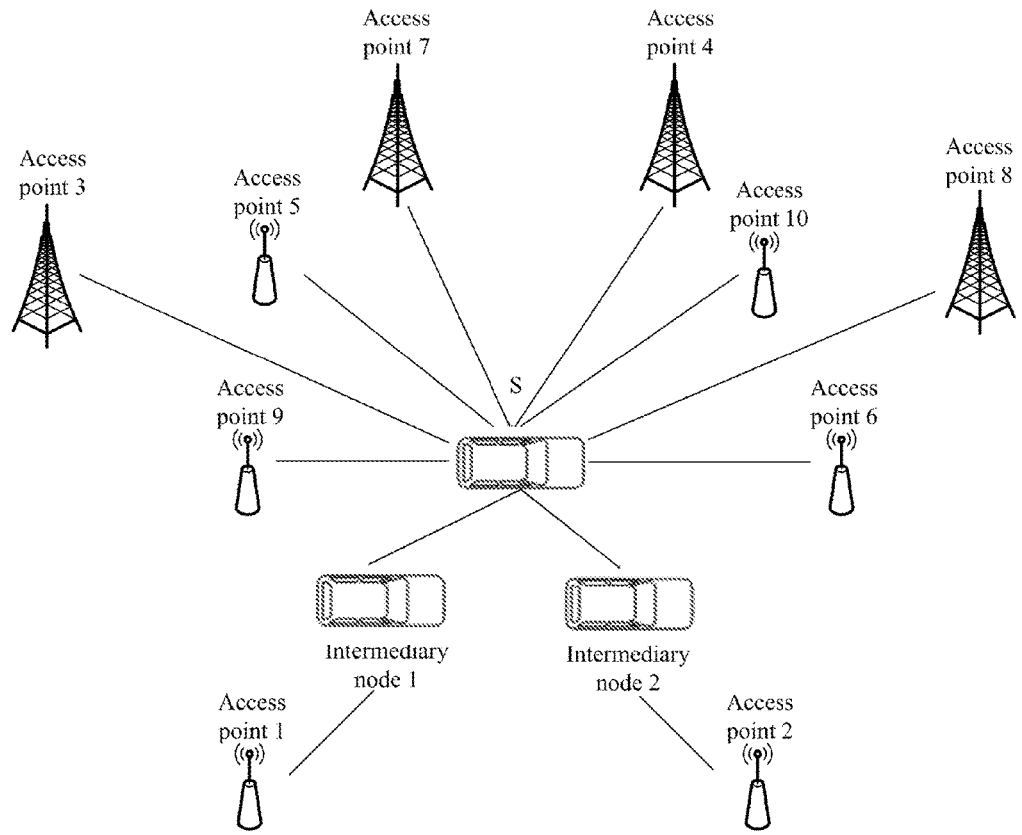
FIG. 2 is a schematic diagram of a heterogeneous network model according to the invention.

By way of an example, taking the Internet of vehicles system as an example, if there are such two on-vehicle terminals in the ad hoc network where the on-vehicle terminal S currently resides that can provide the on-vehicle terminal S with an intermediary access service, that is, the on-vehicle terminal S can be connected with an access point 1 and an access point 2 through the two on-vehicle terminals which are referred to as an intermediary node 1 and an intermediary node 2, and also the on-vehicle terminal S can further access a 3G access point 3 and access point 4 of an operator A, a WiFi access point 5 and access point 6 of the operator A, a 3G access point 7 and access point 8 of an operator B, and a WiFi access point 9 and access point 10 of the operator B, then the heterogeneous network model of the Internet of vehicles created for the on-vehicle terminal S will be referred to as a network G as illustrated in FIG. 2, or any subset, including the on-vehicle terminal S, of the network as illustrated in FIG. 2.

Figure 3:
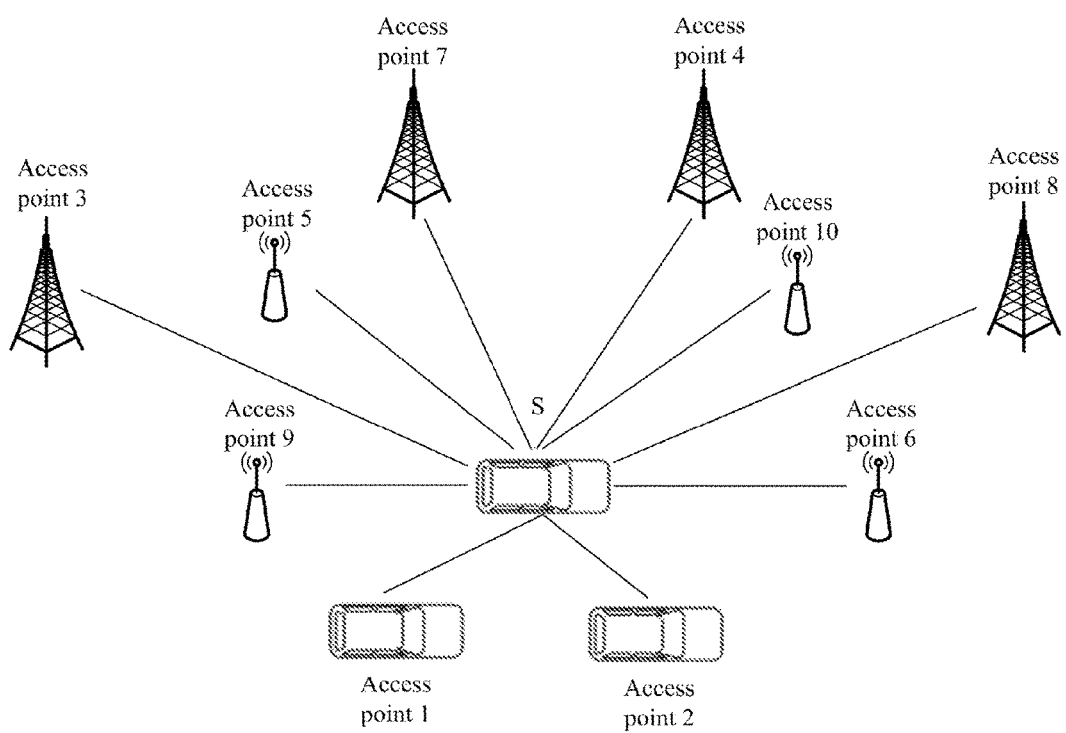
FIG. 3 is a schematic diagram of another heterogeneous network model according to the invention.

In another example, if there are such two on-vehicle terminals in the ad hoc network where the on-vehicle terminal S currently resides that can serve it directly, which are referred to as an access point 1 and an access point 2, that is, the on-vehicle terminal S can be connected directly to the access network through these two on-vehicle devices, and also the on-vehicle terminal S can further access a 3G access point 3 and access point 4 of an operator A, a WiFi access point 5 and access point 6 of the operator A, a 3G access point 7 and access point 8 of an operator B, and a WiFi access point 9 and access point 10 of the operator B, then the heterogeneous network model of the Internet of vehicles created for the on-vehicle terminal S will be referred to as a network G as illustrated in FIG. 3, or any subset, including the on-vehicle terminal S, of the network as illustrated in FIG. 3.

In some embodiments, the access points which can serve the user equipment are grouped into the at least one competing group in the step 11 in the following schemes without any limitation thereto:

The access points which can serve the user equipment are grouped into the at least one competing group under such a principle that access points served by the same operator do not compete with each other, where respective access points served by the same operator are grouped into different competing groups; or The access points which can serve the user equipment are grouped into the at least one competing group under such a principle that access points, operating with the same access technology, served by the same operator do not compete with each other, where respective access points, operating with the same access technology, served by the same operator are grouped into different competing groups; or The access points which can serve the user equipment are grouped into the at least one competing group under such a principle that access points in a preset distance range do not compete with each other, where the respective access points in the preset distance range are grouped into different competing groups; or The access points which can serve the user equipment are grouped into the at least one competing group under such a principle that access points operating with the same access technology do not compete with each other, where respective access points operating with the same access technology are grouped into different competing groups; or The access points which can serve the user equipment are grouped into the at least one competing group under such a principle that access points where a difference between currently available access rates of each of the access points are above a preset threshold, do not compete with each other, where the access points where a difference between currently available access rates of each of the access points are above the preset threshold, are grouped into different competing groups; or The access points which can serve the user equipment are grouped into the at least one competing group under such a principle that access points, which currently can provide such access rates that the differences between the access rates and a preset access rate reference value lie in a preset threshold range, shall compete with each other, where the access points, which currently can provide such access rates that the differences between the access rates and the preset access rate reference value lie in the preset threshold range are grouped into the same competing group; or The access points which can serve the user equipment are grouped randomly into the at least one competing group.

The access points which can serve the user equipment can be grouped otherwise into the at least one competing group instead of being grouped as described in the several grouping schemes listed above, although the invention will not be limited thereto.

In some embodiments, the access overhead of the competing group is determined in the step 12 as follows:

The access overhead of each competing group is determined according to a gain of unit information of the competing group, and access rates to be provided for the user equipment by respective access points in the competing group.

Particularly the access overhead of each of the at least one competing group into which the access points are grouped in the step 11 is determined according to the gain of unit information of the competing group, and the access rates to be provided for the user equipment by the respective access points in the competing group.

Here for each competing group, the access rates to be provided for the user equipment by the respective access points in the competing group are determined respectively as follows:

For each competing group, the access rates to be provided for the user equipment by the respective access points in the competing group are determined respectively under such a principle that net gains of the respective access points in the competing group are maximized.

In some implementation, for each competing group, a differential gaming model can be created to solve for the gain of unit information of the competing group, and the access rates to be provided for the user equipment by the respective access points in the competing group. There are a number of optional implementations of the differential gaming model primarily with the following idea:

There are n participants (i.e., access points) in differential gaming, and the differential gaming model includes two components: one component is an expression of the maximum net gain of a competing access point, where the net gain of the access point is equal to a gross gain minus the cost of the access point, and if the access point is an access point in the ad hoc network, then the gross gain of the access point may be further shared with another or other access points; and the other component reflects a mutual interference between competition strategies applicable to the respective access points, i.e., a relationship between an access rate available from an access point, and a gain of unit information. The differential gaming model can be solved to thereby calculate the gain of unit information of each competing group, and the access rates to be provided for the user equipment by the respective access points in the competing group.

Optionally for each competing group, the gain of unit information of the competing group, and the access rates to be provided for the user equipment by the respective access points in the competing group are determined respectively in the following differential gaming model:

$$\begin{cases} \text{Max}\left[\int_0^\infty \left\{\frac{1}{h_i}P(s)v_i(s) - (v_i(s)^2 b_i + v_i(s)c_i)\right\}e^{-rs}ds\right] \\ \dot{P}(s) = k\left[a - \sum_{i=1}^n v_i(s) - P(s)\right] \end{cases} \quad \text{Equation 1}$$

Where P(s) represents a gain of unit information of the competing group at an instance s of time; $\dot{P}(s)$ represents a derivation operation on P(s); $v_i(s)$ represents an access rate to be provided for the user equipment by the i-th access point in the competing group at the instance s of time, where i=1, 2, ..., n, and n represents the number of access points in the competing group; $h_i$ represents the number of hops between the user equipment, and the i-th access point in the competing group; r represents a discount rate; $v_i(s)^2 b_i + v_i(s) c_i$ represents the cost of the i-th access point, where $b_i$ and $c_i$ represents preset coefficients; k represents a rate at which a price is adjusted by a market; and $$a - \sum_{i=1}^n v_i(s)$$

represents an instantaneous inverted demand function.

It shall be noted that the parameter $h_i$ in the differential gaming model represents the number of hops between the user equipment, and the i-th access point in the competing group, and particularly the value of this parameter is such that if the user equipment is connected directly with the i-th access point, then $h_i=1$; and if the user equipment is connected with the i-th access point through a number m of intermediate points, then $h_i=m+1$.

The differential gaming model as illustrated in Equation 1 is solved for the access rate to be provided for the user equipment by each access point in the competing group, which is $$v_i(s) = \frac{(1 - h_i k A_i)P(s) + h_i(kB_i - c_i)}{2h_i b_i}, \; i = 1, 2, \ldots, n.$$

where $A_i$ and $B_i$ represent solutions to a set of n-element quadratic equations $$\frac{k^2 A_i^2}{2b_i} - \left(\sum_{j=1}^n \frac{k}{h_j b_j} + r + 2k\right)A_i + \frac{1}{2h_i^2 b_i} + \sum_{\substack{j=1 \\ j \neq i}}^n \frac{k^2 A_i A_j}{b_j} = 0,$$

and a set of n-element simple equations $$\left(\sum_{j=1}^n \frac{k(1 - h_j k A_j)}{2h_j b_j} + k + r\right)B_i - \sum_{\substack{j=1 \\ j \neq i}}^n \frac{k^2 A_i B_j}{2b_j} - \frac{c_i}{2h_i b_i} + kA_i a + \sum_{j=1}^n \frac{kA_i c_j}{2b_j} = 0$$

respectively, i.e.:

$$C_i = \frac{1}{r}\left[-\frac{k^2 B_i^2 - c_i^2}{4b_i} - kB_i\left(a - \sum_{j=1}^n \frac{kB_j - c_j}{2b_j}\right)\right], \text{ and}$$

$$P^*(s) =$$

$$\left(P_0 - \frac{a + \sum_{i=1}^n \frac{c_i - kB_i}{2b_i}}{1 + \sum_{i=1}^n \frac{(1 - h_i k A_i)}{2h_i b_i}}\right) e^{-\left[k + \sum_{i=1}^n \frac{k(1 - h_i k A_i)}{2h_i b_i}\right]s} + \frac{a + \sum_{i=1}^n \frac{c_i - kB_i}{2b_i}}{1 + \sum_{i=1}^n \frac{(1 - h_i k A_i)}{2h_i b_i}}.$$

Further to any one of the embodiments above, optionally the access overhead of the competing group is determined according to the gain of unit information of the competing group, and the access rates to be provided for the user equipment by the respective access points in the competing group in the step 12 in the equation of:

$$\sum_{i=1}^n \int_0^\infty P(s)v_i(s)ds; \quad \text{Equation 2;}$$

Where P(s) represents a gain of unit information of the competing group at an instance s of time; and $v_i(s)$ represents an access rate to be provided for the user equipment by the i-th access point in the pre-selected competing group at the instance s of time, where i=1, 2, ..., n, and n represents the number of access points in the pre-selected competing group.

In some embodiments, an access overhead of each pre-selected competing group can also be determined in the differential gaming model, and generally the access overhead of each pre-selected competing group is the sum of gross gains of respective access points in the pre-selected competing group.

Further to any one of the embodiments above, the target competing group is further selected for the accessing user equipment from the competing group according to the determined access overhead in the step 12 as follows:

The target competing group is selected for the accessing user equipment from the competing group according to a demand of the user equipment for the network quality of the access network.

Here the demand of the user equipment for a network quality of the access network includes but will not be limited to one or more of the following demands:

A demand of the user equipment for a delay of the access network, for example, the delay of the access network is smaller than a preset delay, etc.;

A demand of the user equipment for a dithering of the access network, for example, the dithering of the access network is below a preset threshold, etc.; and A demand of the user equipment for a packet loss ratio of the access network, for example, the packet loss ratio of the access network is below a preset threshold y, etc.

In some embodiments, the target competing group can be selected for the user equipment from the competing group according to the determined access overhead of each competing group in the step 12 by selecting a competing group satisfying a preset access overhead condition as the target competing group only according to the access overhead of each competing group; or selecting a competing group satisfying both a preset access overhead condition, and the demand of the user equipment for the network quality of the access network as the target competing group according to the access overhead of each competing group, and the demand of the user equipment for the network quality of the access network.

Here the preset access overhead condition can be such that the access overhead is minimum, or the access overhead is below a preset threshold, or lies in a preset threshold range, etc. If there are at least two competing groups, all of which satisfy the preset access overhead condition, then one of the at least two competing groups can be selected randomly as the target competing group.

It shall be noted that the access rate as referred to in embodiments of the invention can alternatively be construed as another quantization index of a spectrum resource, e.g., a bandwidth, that is, an access rate currently available from an access point can be construed as a bandwidth currently available from the access point, and an access rate to be provided for the user equipment by the access point can be constructed as a bandwidth to be provided for the user equipment by the access point.

Figure 4:
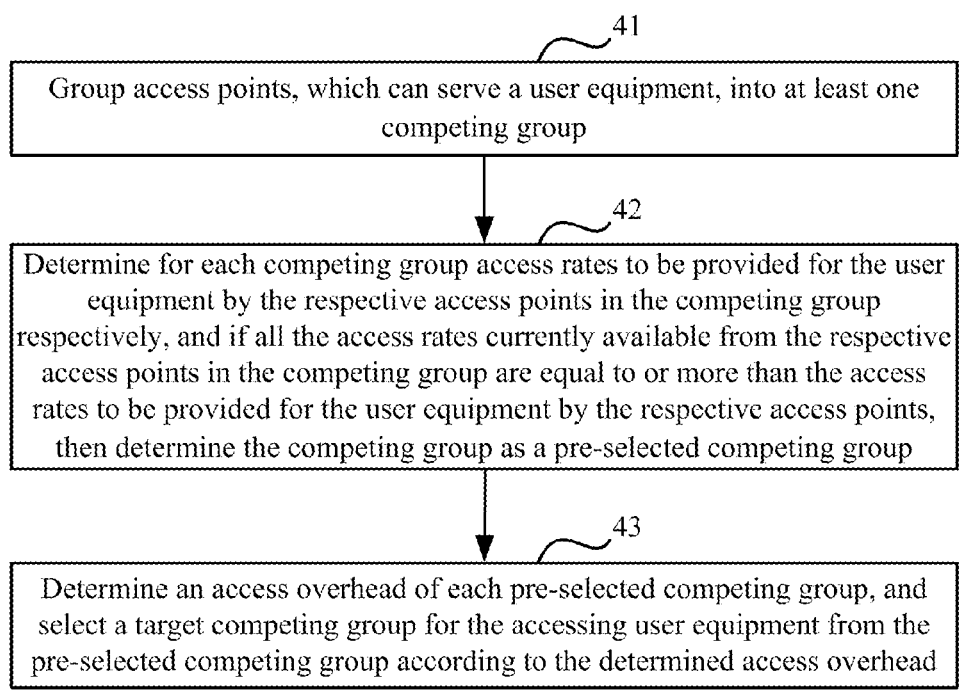
FIG. 4 is a schematic flow chart of a second accessing method in a heterogeneous according to the invention.

FIG. 4 illustrates a second accessing method in a heterogeneous according to some embodiments of the invention, and as illustrated in FIG. 4, the method includes the followings steps:

The step 41 is to group access points, which can serve a user equipment, into at least one competing group.

In this step, the access points which can serve the user equipment are grouped into at least one group, each of which is referred to as a competing group in which there is at least one access point which can serve the user equipment.

The step 42 is to determine for each competing group access rates to be provided for the user equipment by the respective access points in the competing group respectively, and if all the access rates currently available from the respective access points in the competing group are equal to or greater than the access rates to be provided for the user equipment by the respective access points, to determine the competing group as a pre-selected competing group.

In this step, firstly the competing group into which the access points are grouped in the step 11 is screened out, and the competing group satisfying the condition (that is, all the access rates currently available from the respective access points in the competing group are equal to or greater than the access rates to be provided for the user equipment by the respective access points) is determined as the pre-selected competing group to thereby improve the efficiency of processing.

The step 43 is to determine an access overhead of each pre-selected competing group, and to select a target competing group for the accessing user equipment from the pre-selected competing group according to the determined access overhead.

In this step, one of the pre-selected competing groups is selected for the accessing user equipment according to the determined access overhead, where the selected pre-selected competing group is defined as the target competing group, and the user equipment can access each access point in the target competing group.

In embodiments of the invention, firstly the access points which can serve the user equipment are grouped into the competing groups; then for each competing group, the access rates to be provided for the user equipment by the respective access points in the competing group are determined, and if all the access rates currently available from the respective access points in the competing group are equal to or greater than the access rates to be provided for the user equipment by the respective access points, the competing group will be determined as the pre-selected competing group; and finally the access overhead of each pre-selected competing group is determined, and one of the pre-selected competing groups is selected for the accessing user equipment according to the determined access overhead, thus providing such a solution to competition for traffic in a heterogeneous network that the operators can compete cooperatively through dynamic pricing at a fine competition granularity up to the traffic so as to extend the mode in which the same service can only be served by one operator at the same time in the prior art, so that the user equipment can select different access schemes, thus providing a new traffic operating mode for the development of the network.

In some embodiments, before the step 41, the method further includes creating a heterogeneous network model, that is, determining the access points in the heterogeneous network, which can serve the user equipment. The heterogeneous network model can be created particularly as described above in the first accessing method in a heterogeneous network, so a repeated description thereof will be omitted here.

Optionally the access points can be grouped in the step 41 by grouping all the access points in the heterogeneous network, which can serve the user equipment, or a subset of the access points in the heterogeneous network, which can serve the user equipment.

In some embodiments, the access points which can serve the user equipment are grouped into the at least one competing group in the step 41 in the following schemes without any limitation thereto:

The access points which can serve the user equipment are grouped into the at least one competing group under such a principle that access points served by the same operator do not compete with each other, where respective access points served by the same operator are grouped into different competing groups; or The access points which can serve the user equipment are grouped into the at least one competing group under such a principle that access points, operating with the same access technology, served by the same operator do not compete with each other, where respective access points, operating with the same access technology, served by the same operator are grouped into different competing groups; or The access points which can serve the user equipment are grouped into the at least one competing group under such a principle that access points in a preset distance range do not compete with each other, where the respective access points in the preset distance range are grouped into different competing groups; or The access points which can serve the user equipment are grouped into the at least one competing group under such a principle that access points operating with the same access technology do not compete with each other, where respective access points operating with the same access technology are grouped into different competing groups; or The access points which can serve the user equipment are grouped into the at least one competing group under such a principle that access points where a difference between currently available access rates of each of the access points are above a preset threshold, do not compete with each other, where the access points where a difference between currently available access rates of each of the access points are above the preset threshold, are grouped into different competing groups; or The access points which can serve the user equipment are grouped into the at least one competing group under such a principle that access points, which currently can provide such access rates that the differences between the access rates and a preset access rate reference value lie in a preset threshold range, shall compete with each other, where the access points, which currently can provide such access rates that the differences between the access rates and the preset access rate reference value lie in the preset threshold range are grouped into the same competing group; or The access points which can serve the user equipment are grouped randomly into the at least one competing group.

The access points which can serve the user equipment can be grouped otherwise into the at least one competing group instead of being grouped as described in the several grouping schemes listed above, although the invention will not be limited thereto.

In some embodiments, the step 42 further includes: for each competing group, if the access rate currently available from at least one access point in the competing group is less than the access rate to be provided for the user equipment by the access point, then discarding the competing group.

Optionally for each competing group, the access rates currently available from the respective access points in the competing group are detected in real time according to network load conditions of the respective access points, and if all the access rates currently available from the respective access points in the competing group are equal to or greater than the access rates to be provided for the user equipment by the respective access points, then the competing group will be determined as the pre-selected competing group, and the access overhead of the pre-selected competing group will be calculated; otherwise, that is, if the access rate currently available from at least one access point in the competing group is less than the access rate to be provided for the user equipment by the access point, then the competing group will be discarded.

In some embodiments, Optionally for each competing group, the access rates to be provided for the user equipment by the respective access points in the competing group are determined respectively in the step 42 as follows:

For each competing group, the access rates to be provided for the user equipment by the respective access points in the competing group are determined respectively under such a principle that net gains of the respective access points in the competing group are maximized.

In some embodiments, for each competing group, a differential gaming model can be created to solve for the access rates to be provided for the user equipment by the respective access points in the competing group. There are a number of particular implementations of the differential gaming model primarily with the following idea:

There are n participants (i.e., access points) in differential gaming, and the differential gaming model includes two components: one component is an expression of the maximum net gain of a competing access point, where the net gain of the access point is equal to a gross gain minus the cost of the access point, and if the access point is an access point in the ad hoc network, then the gross gain of the access point may be further shared with another or other access points; and the other component reflects a mutual interference between competition strategies applicable to the respective access points, i.e., a relationship between an access rate available from an access point, and a gain of unit information. The differential gaming model can be solved to thereby calculate the gain of unit information of each competing group, and the access rates to be provided for the user equipment by the respective access points in the competing group.

Optionally for each competing group, the access rates to be provided for the user equipment by the respective access points in the competing group are determined respectively in the differential gaming model as illustrated in Equation 1 above. They can be calculated particularly as described above in the first accessing method in a heterogeneous network, so a repeated description thereof will be omitted here.

Further to any one of the embodiments above, the access overhead of each pre-selected competing group is determined in the step 43 as follows:

The access overhead of each pre-selected competing group is determined according to the gain of unit information of the pre-selected competing group, and the access rates to be provided for the user equipment by the respective access points in the pre-selected competing group.

Optionally the access overhead of each pre-selected competing group is determined in Equation 2 above. It can be calculated particularly as described above in the first accessing method in a heterogeneous network, so a repeated description thereof will be omitted here.

Further to any one of the embodiments above, the target competing group is further selected for the accessing user equipment from the pre-selected competing group according to the determined access overhead in the step 43 as follows:

The target competing group is selected for the accessing user equipment from the pre-selected competing group according to a demand of the user equipment for the network quality of the access network.

Here the demand of the user equipment for a network quality of the access network includes but will not be limited to one or more of the following demands:

A demand of the user equipment for a delay of the access network, for example, the delay of the access network is smaller than a preset delay, etc.;

A demand of the user equipment for a dithering of the access network, for example, the dithering of the access network is below a preset threshold, etc.; and A demand of the user equipment for a packet loss ratio of the access network, for example, the packet loss ratio of the access network is below a preset threshold y, etc.

Optionally the target competing group can be selected for the user equipment from the pre-selected competing group according to the determined access overhead of each pre-selected competing group in the step 43 by selecting a pre-selected competing group satisfying a preset access overhead condition as the target competing group only according to the access overhead of each pre-selected competing group; or selecting a pre-selected competing group satisfying both a preset access overhead condition, and the demand of the user equipment for the network quality of the access network as the target competing group according to the access overhead of each pre-selected competing group, and the demand of the user equipment for the network quality of the access network.

Here the preset access overhead condition can be such that the access overhead is minimum, or the access overhead is below a preset threshold, or lies in a preset threshold range, etc. If there are at least two competing groups, all of which satisfy the preset access overhead condition, then one of the at least two competing groups can be selected randomly as the target competing group.

It shall be noted that the access rate as referred to in the embodiments of the invention can alternatively be construed as another quantization index of a spectrum resource, e.g., a bandwidth, that is, an access rate currently available from an access point can be construed as a bandwidth currently available from the access point, and an access rate to be provided for the user equipment by the access point can be constructed as a bandwidth to be provided for the user equipment by the access point.

Taking an Internet of vehicles system as an example, the accessing method in a heterogeneous network according to the invention will be described below in connection with embodiments of the invention.

Figure 5:
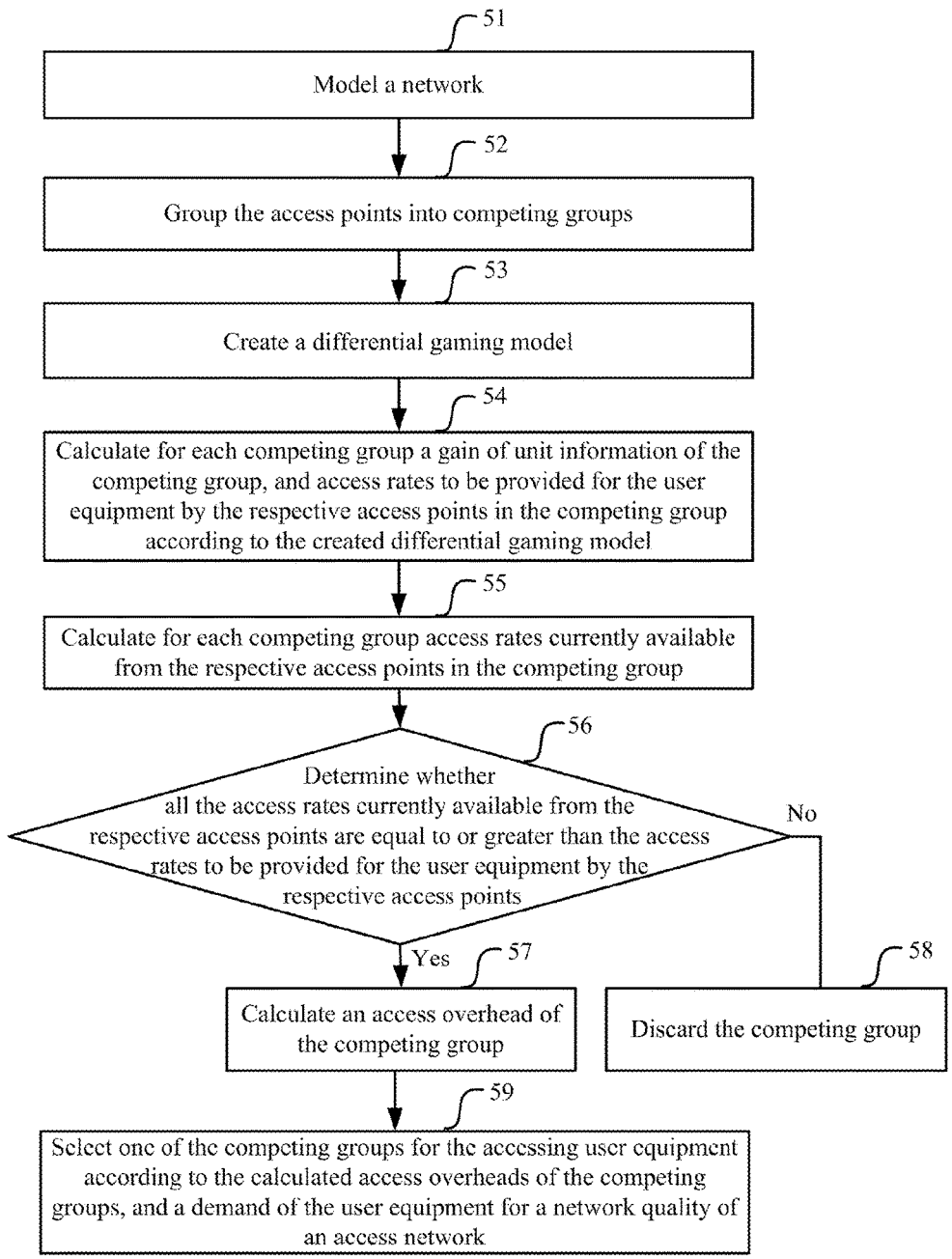
FIG. 5 is a schematic flow chart of a first embodiment of the invention.

In a first embodiment, a processing flow of this embodiment is as illustrated in FIG. 5 including the following steps:

The step 51 is to model a network, and to determine access points in the network, which can serve a user equipment.

The step 52 is to group the determined access points into a plurality of competing groups.

Taking a network model as illustrated in FIG. 3 as an example, if the access points are grouped into the competing groups in this step under such a principle that access points, operating with the same access technology, served by the same operator do not compete with each other, then the access points will be grouped into 16 competing groups, each of which includes 6 access points, i.e., (1,2,3,5,7,9), (1,2,3,5,7,10), (1,2,3,5,8,9), (1,2,3,5,8,10), (1,2,3,6,7,9), (1,2,3,6,7,10), (1,2,3,6,8,9), (1,2,3,6,8,10), (1,2,4,5,7,9), (1,2,4,5,7,10), (1,2,4,5,8,9), (1,2,4,5,8,10), (1,2,4,6,7,9), (1,2,4,6,7,10), (1,2,4,6,8,9), (1,2,4,6,8,10) respectively.

The step 53 is to create a differential gaming model.

There are n participants (access points), denoted as $V_1$, $V_2 \ldots , V_n$ in some competing group; $h_i$ represents the number of hops traversed by an on-vehicle terminal to the i-th access point; P(s) represents a gain of unit information at an instance s of time; a strategy of a participant $V_i$ is an access rate $v_i(s)$ available from the participant; a cost of the participant $V_i$ generally includes a power source cost and a network cost, and there is a quadratic function relationship, represented as $v_i^2 b_i + v_i c_i$, between the cost of the participant, and the access rate available from the participant; $P_0$ represents a gain of unit information at an initial instance of time; and the strategy relationship between participants in a duopoly market as defined by Tsutsui and Mino is extended to the n participants, thus resulting in a competition strategy relationship among the n access points, i.e., a relationship between the gain of unit information at the instance s of time, P(s), and the access rate $v_i(s)$ of the participant $v_i$.

The step 54 is to calculate for each competing group a gain of unit information of the competing group, and access rates to be provided for the user equipment by the respective access points in the competing group according to the created differential gaming model.

The step 55 is to calculate for each competing group access rates currently available from the respective access points in the competing group.

The step 56 is to determine for each competing group whether all the access rates currently available from the respective access points in the competing group are equal to or greater than the access rates to be provided for the user equipment by the respective access points; and If so, then the flow will proceed to the step 57;

Otherwise, the flow will proceed to the step 58;

The step 57 is to calculate an access overhead of the competing group, and to proceed to the step 59;

The step 58 is to discard the competing group; and

The step 59 is to select one of the competing groups for the accessing user equipment according to the calculated access overheads of the competing groups, and a demand of the user equipment for a network quality of an access network.

Based upon the same inventive idea, some embodiments of the invention further provide an accessing apparatus in a heterogeneous network, and since the apparatus addresses the problem under a similar principle to the first accessing method in a heterogeneous network, and the second accessing method in a heterogeneous network, reference can be made for the implementations of the methods for an implementation of the apparatus, so a repeated description thereof will be omitted here.

Figure 6:
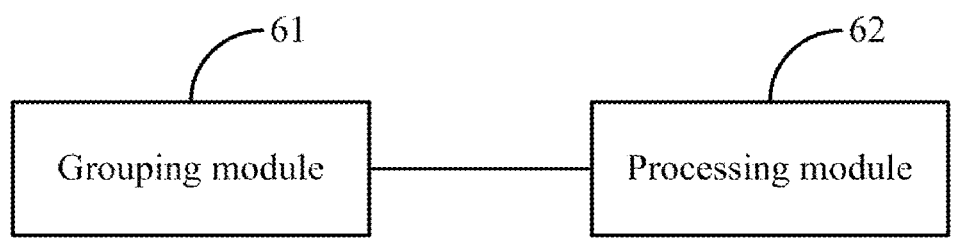
FIG. 6 is a schematic diagram of an accessing apparatus in a heterogeneous network according to the invention.

FIG. 6 illustrates an accessing apparatus in a heterogeneous network according to some embodiments of the invention, where the apparatus includes:

A grouping module 61 is configured to group access points, which can serve a user equipment, into at least one competing group; and A processing module 62 is configured to determine an access overhead of the competing group, and to select a target competing group for the accessing user equipment from the competing group according to the determined access overhead.

The apparatus according to embodiments of the invention can be arranged in a user equipment, or can be arranged in another device, e.g., a higher-layer device configured to schedule respective user equipments (e.g., a base station, etc.)

In some embodiments, the grouping module 61 is configured:

To group the access points, which can serve the user equipment, into the at least one competing group under such a principle that access points served by the same operator do not compete with each other, where respective access points served by the same operator are grouped into different competing groups; or To group the access points, which can serve the user equipment, into the at least one competing group under such a principle that access points, operating with the same access technology, served by the same operator do not compete with each other, where respective access points, operating with the same access technology, served by the same operator are grouped into different competing groups; or To group the access points, which can serve the user equipment, into the at least one competing group under such a principle that access points in a preset distance range do not compete with each other, where the respective access points in the preset distance range are grouped into different competing groups; or To group the access points, which can serve the user equipment, into the at least one competing group under such a principle that access points operating with the same access technology do not compete with each other, where respective access points operating with the same access technology are grouped into different competing groups; or To group the access points, which can serve the user equipment, into the at least one competing group under such a principle that access points where a difference between currently available access rates of each of the access points are above a preset threshold, do not compete with each other, where the access points where a difference between currently available access rates of each of the access points are above the preset threshold, are grouped into different competing groups; or To group the access points, which can serve the user equipment, into the at least one competing group under such a principle that access points, which currently can provide such access rates that the differences between the access rates and a preset access rate reference value lie in a preset threshold range, shall compete with each other, where the access points, which currently can provide such access rates that the differences between the access rates and the preset access rate reference value lie in the preset threshold range are grouped into the same competing group; or To group randomly the access points, which can serve the user equipment, into the at least one competing group.

In a first preferred embodiment, the processing module 62 is configured, for the competing group into which the access points are grouped by the grouping module 61:

To determine the access overhead of each competing group, and to select the target competing group for the accessing user equipment from the competing group according to the determined access overhead.

In a second preferred embodiment, the processing module 62 is configured:

For each competing group, to determine access rates to be provided for the user equipment by the respective access points in the competing group respectively, and if all the access rates currently available from the respective access points in the competing group are equal to or greater than the access rates to be provided for the user equipment by the respective access points, to determine the competing group as a pre-selected competing group; and to determine an access overhead of each pre-selected competing group, and to select the target competing group for the accessing user equipment from the pre-selected competing group according to the determined access overhead.

In this preferred embodiment, the processing module 62 firstly screens out the competing group into which the access points are grouped by the grouping module 61, and determines the competing group satisfying the condition (that is, all the access rates currently available from the respective access points in the competing group are equal to or greater than the access rates to be provided for the user equipment by the respective access points) as the pre-selected competing group; and further determines the access overhead of each pre-selected competing group, and selects the target competing group for the accessing user equipment from the pre-selected competing group according to the determined access overhead to thereby improve the efficiency of processing.

In this preferred embodiment, the processing module 62 is further configured, for each competing group, if the access rate currently available from at least one access point in the competing group is less than the access rate to be provided for the user equipment by the access point, to discard the competing group.

Optionally for each competing group, the processing module 62 detects in real time the access rates currently available from the respective access points in the competing group according to network load conditions of the respective access points, and if all the access rates currently available from the respective access points in the competing group are equal to or greater than the access rates to be provided for the user equipment by the respective access points, then the processing module 62 will determine the competing group as the pre-selected competing group, and calculate the access overhead of the pre-selected competing group; otherwise, that is, if the access rate currently available from at least one access point in the competing group is less than the access rate to be provided for the user equipment by the access point, then the processing module 62 will discard the competing group.

In some embodiments, for each competing group, the processing module 62 is configured:

For each competing group, to determine the access rates to be provided for the user equipment by the respective access points in the competing group respectively under such a principle that net gains of the respective access points in the competing group are maximized.

Optionally for each competing group, the processing module 62 is configured to determine the access rates to be provided for the user equipment by the respective access points in the competing group respectively in the following differential gaming model:

$$\begin{cases} \text{Max}\left[\int_0^\infty \left\{\frac{1}{h_i}P(s)v_i(s) - (v_i(s)^2 b_i + v_i(s)c_i)\right\}e^{-rs}ds\right] \\ \dot{P}(s) = k\left[a - \sum_{i=1}^n v_i(s) - P(s)\right] \end{cases};$$

Where P(s) represents a gain of unit information of the competing group at an instance s of time; $\dot{P}(s)$ represents a derivation operation on P(s); $v_i(s)$ represents an access rate to be provided for the user equipment by the i-th access point in the pre-selected competing group at the instance s of time, where i=1, 2, . . . , n, and n represents the number of access points in the pre-selected competing group; $h_i$ represents the number of hops between the user equipment, and the i-th access point in the pre-selected competing group; r represents a discount rate; and $v_i(s)^2 b_i + v_i(s)c_i$ represents the cost of the i-th access point, where $b_i$ and $c_i$ represents preset coefficients.

Further to any one of the embodiments above, the processing module 62 is configured to determine the access overhead of the competing group by:

determining the access overhead of each competing group according to a gain of unit information of the competing group, and access rates to be provided for the user equipment by the respective access points in the competing group.

Optionally, in the first preferred embodiment, the processing module 62 is configured to determine the access overhead of the competing group by determining the access overhead of each competing group according to a gain of unit information of the competing group, and the access rates to be provided for the user equipment by the respective access points in the competing group;

In the second preferred embodiment, the processing module 62 is configured to determine the access overhead of the competing group by determining an access overhead of each pre-selected competing group according to a gain of unit information of the pre-selected competing group, and access rates to be provided for the user equipment by the respective access points in the pre-selected competing group.

Optionally the processing module 62 is configured to determine the access overhead of the competing group in the equation of:

$$\sum_{i=1}^n \int_0^\infty P(s)v_i(s)ds;$$

Where P(s) represents a gain of unit information of the competing group at an instance s of time; and $v_i(s)$ represents an access rate available from the i-th access point in the competing group at the instance s of time, where i=1, 2, ..., n, and n represents the number of access points in the competing group.

Optionally, if the processing module 62 operates in the first preferred embodiment, then P(s) represents a gain of unit information of the competing group at an instance s of time; and $v_i(s)$ represents an access rate available from the i-th access point in the competing group at the instance s of time, where i=1, 2, ..., n, and n represents the number of access points in the competing group in the competing group in the equation above; and If the processing module 62 operates the second preferred embodiment, then P(s) represents a gain of unit information of the pre-selected competing group at an instance s of time; and $v_i(s)$ represents an access rate available from the i-th access point in the pre-selected competing group at the instance s of time, where i=1, 2, ..., n, and n represents the number of access points in the competing group in the pre-selected competing group in the equation above.

Further to any one of the embodiments above, the processing module 62 is further configured:

To select the target competing group for the accessing user equipment from the competing group according to a demand of the user equipment for a network quality of an access network.

Here the demand of the user equipment for a network quality of the access network includes but will not be limited to one or more of the following demands:

A demand of the user equipment for a delay of the access network, for example, the delay of the access network is smaller than a preset delay, etc.;

A demand of the user equipment for a dithering of the access network, for example, the dithering of the access network is below a preset threshold, etc.; and A demand of the user equipment for a packet loss ratio of the access network, for example, the packet loss ratio of the access network is below a preset threshold y, etc.

Optionally, in the first preferred embodiment, the processing module 62 is further configured to select the target competing group for the accessing user equipment from the competing group according to the demand of the user equipment for the network quality of the access network; that is, the processing module 62 can select a competing group satisfying a preset access overhead condition as the target competing group only according to the access overhead of the competing group into which the access points are grouped by the grouping module 61; or the processing module 62 can select a competing group satisfying both a preset access overhead condition, and the demand of the user equipment for the network quality of the access network as the target competing group according to the access overhead of the competing group into which the access points are grouped by the grouping module 61, and the demand of the user equipment for the network quality of the access network.

Here the preset access overhead condition can be such that the access overhead is minimum, or the access overhead is below a preset threshold, or lies in a preset threshold range, etc. If there are at least two competing groups, all of which satisfy the preset access overhead condition, then one of the at least two competing groups can be selected randomly as the target competing group.

In the second preferred embodiment, the processing module 62 is further configured to select the target competing group for the accessing user equipment from the pre-selected competing group according to the demand of the user equipment for the network quality of the access network; that is, the processing module 62 can select a pre-selected competing group satisfying a preset access overhead condition as the target competing group only according to an access overhead of a pre-selected competing group determined by the processing module 62; or the processing module 62 can select a competing group satisfying both a preset access overhead condition, and the demand of the user equipment for the network quality of the access network as the target competing group according to an access overhead of a pre-selected competing group determined by the processing module 62, and the demand of the user equipment for the network quality of the access network.

Here the preset access overhead condition can be such that the access overhead is minimum, or the access overhead is below a preset threshold, or lies in a preset threshold range, etc. If there are at least two pre-selected competing groups, all of which satisfy the preset access overhead condition, then one of the at least two pre-selected competing groups can be selected randomly as the target competing group.

A structure of and processing by a communication device according to some embodiments of the invention will be described below in connection with a hardware structure thereof taking a user equipment as an example, where the communication device can be arranged in the user equipment, or can be arranged in another device, e.g., a higher-layer device configured to schedule respective user equipments (e.g., a base station, etc.)

Figure 7:
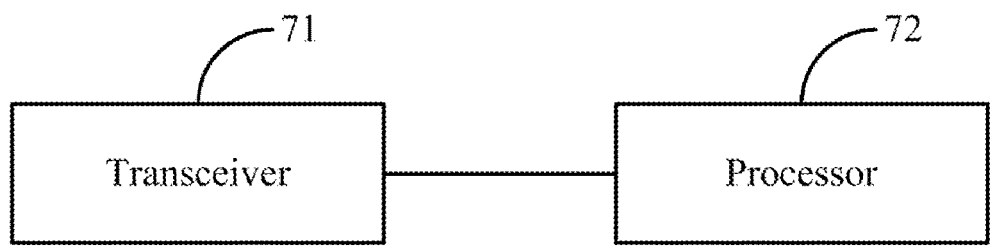
FIG. 7 is a schematic diagram of a communication device according to the invention.

As illustrated in FIG. 7, the communication device includes a transceiver 71, and at least one processor 72 connected with the transceiver 71, where:

The transceiver 71 is configured to communicate data with another device; and The processor 72 is configured to group access points, which can serve a user equipment, into at least one competing group; and to determine an access overhead of the competing group, and to select a target competing group for the accessing user equipment from the competing group according to the determined access overhead.

In some embodiments, the processor 72 is configured:

To group the access points, which can serve the user equipment, into the at least one competing group under such a principle that access points served by the same operator do not compete with each other, where respective access points served by the same operator are grouped into different competing groups; or To group the access points, which can serve the user equipment, into the at least one competing group under such a principle that access points, operating with the same access technology, served by the same operator do not compete with each other, where respective access points, operating with the same access technology, served by the same operator are grouped into different competing groups; or To group the access points, which can serve the user equipment, into the at least one competing group under such a principle that access points in a preset distance range do not compete with each other, where the respective access points in the preset distance range are grouped into different competing groups; or To group the access points, which can serve the user equipment, into the at least one competing group under such a principle that access points operating with the same access technology do not compete with each other, where respective access points operating with the same access technology are grouped into different competing groups; or To group the access points, which can serve the user equipment, into the at least one competing group under such a principle that access points where a difference between currently available access rates of each of the access points are above a preset threshold, do not compete with each other, where the access points where a difference between currently available access rates of each of the access points are above the preset threshold, are grouped into different competing groups; or To group the access points, which can serve the user equipment, into the at least one competing group under such a principle that access points, which currently can provide such access rates that the differences between the access rates and a preset access rate reference value lie in a preset threshold range, shall compete with each other, where the access points, which currently can provide such access rates that the differences between the access rates and the preset access rate reference value lie in the preset threshold range are grouped into the same competing group; or To group randomly the access points, which can serve the user equipment, into the at least one competing group.

In some embodiments, in a first preferred embodiment, the processor 72 is configured, for all the competing groups into which the access points are grouped:

To determine the access overhead of each competing group, and to select the target competing group for the accessing user equipment from the competing groups according to the determined access overhead.

In a second preferred embodiment, the processor 72 is configured:

For each competing group, to determine access rates to be provided for the user equipment by the respective access points in the competing group respectively, and if all the access rates currently available from the respective access points in the competing group are equal to or greater than the access rates to be provided for the user equipment by the respective access points, to determine the competing group as a pre-selected competing group; and to determine an access overhead of each pre-selected competing group, and to select the target competing group for the accessing user equipment from the pre-selected competing groups according to the determined access overheads.

In this preferred embodiment, the processor 72 firstly screens out the competing groups into which the access points are grouped by the processor 72, and determines the competing groups satisfying the condition (that is, all the access rates currently available from the respective access points in the competing group are equal to or greater than the access rates to be provided for the user equipment by the respective access points) as the pre-selected competing groups; and further determines the access overhead of each pre-selected competing group, and selects the target competing group for the accessing user equipment from the pre-selected competing groups according to the determined access overheads to thereby improve the efficiency of processing.

In this preferred embodiment, the processor 72 is further configured, for each competing group, if the access rate currently available from at least one access point in the competing group is less than the access rate to be provided for the user equipment by the access point, to discard the competing group.

Optionally for each competing group, the processor 72 detects in real time the access rates currently available from the respective access points in the competing group according to network load conditions of the respective access points, and if all the access rates currently available from the respective access points in the competing group are equal to or greater than the access rates to be provided for the user equipment by the respective access points, then the processor 72 will determine the competing group as the pre-selected competing group, and calculate the access overhead of the pre-selected competing group; otherwise, that is, if the access rate currently available from at least one access point in the competing group is less than the access rate to be provided for the user equipment by the access point, then the processor 72 will discard the competing group.

In some embodiments, for each competing group, the processor 72 is configured:

For each competing group, to determine the access rates to be provided for the user equipment by the respective access points in the competing group respectively under such a principle that net gains of the respective access points in the competing group are maximized.

Optionally for each competing group, the processor 72 is configured to determine the access rates to be provided for the user equipment by the respective access points in the competing group respectively in the following differential gaming model:

$$\begin{cases} \text{Max}\left[\int_0^\infty \left\{\frac{1}{h_i}P(s)v_i(s) - (v_i(s)^2 b_i + v_i(s)c_i)\right\}e^{-rs}ds\right] \\ \dot{P}(s) = k\left[a - \sum_{i=1}^n v_i(s) - P(s)\right] \end{cases};$$

Where P(s) represents a gain of unit information of the competing group at an instance s of time; $\dot{P}(s)$ represents a derivation operation on P(s); $v_i(s)$ represents an access rate to be provided for the user equipment by the i-th access point in the pre-selected competing group at the instance s of time, where i=1, 2, . . . , n, and n represents the number of access points in the pre-selected competing group; $h_i$ represents the number of hops between the user equipment, and the i-th access point in the pre-selected competing group; r represents a discount rate; and $v_i(s)^2 b_i + v_i(s)c_i$ represents the cost of the i-th access point, where $b_i$ and $c_i$ represents preset coefficients.

Further to any one of the embodiments above, the processor 72 is configured to determine the access overhead of the competing group by:

determining the access overhead of each competing group according to a gain of unit information of the competing group, and access rates to be provided for the user equipment by the respective access points in the competing group.

Optionally in the first preferred embodiment, the processor 72 is configured to determine the access overhead of the competing group by determining the access overhead of each competing group according to a gain of unit information of the competing group, and the access rates to be provided for the user equipment by the respective access points in the competing group;

In the second preferred embodiment, the processor 72 is configured to determine the access overhead of the competing group by determining an access overhead of each pre-selected competing group according to a gain of unit information of the pre-selected competing group, and access rates to be provided for the user equipment by the respective access points in the pre-selected competing group.

Optionally the processor 72 is configured to determine the access overhead of the competing group in the equation of:

$$\sum_{i=1}^n \int_0^\infty P(s)v_i(s)ds;$$

Where P(s) represents a gain of unit information of the competing group at an instance s of time; and $v_i(s)$ represents an access rate available from the i-th access point in the competing group at the instance s of time, where i=1, 2, . . . , n, and n represents the number of access points in the competing group.

Optionally, if the processor 72 operates in the first preferred embodiment, then P(s) represents a gain of unit information of the competing group at an instance s of time; and $v_i(s)$ represents an access rate available from the i-th access point in the competing group at the instance s of time, where i=1, 2, . . . , n, and n represents the number of access points in the competing group in the competing group in the equation above; and If the processor 72 operates the second preferred embodiment, then P(s) represents a gain of unit information of the pre-selected competing group at an instance s of time; and $v_i(s)$ represents an access rate available from the i-th access point in the pre-selected competing group at the instance s of time, where i=1, 2, . . . , n, and n represents the number of access points in the competing group in the pre-selected competing group in the equation above.

Further to any one of the embodiments above, the processor 72 is further configured:

To select the target competing group for the accessing user equipment from the competing group according to a demand of the user equipment for a network quality of an access network.

Here the demand of the user equipment for a network quality of the access network includes but will not be limited to one or more of the following demands:

A demand of the user equipment for a delay of the access network, for example, the delay of the access network is smaller than a preset delay, etc.;

A demand of the user equipment for a dithering of the access network, for example, the dithering of the access network is below a preset threshold, etc.; and A demand of the user equipment for a packet loss ratio of the access network, for example, the packet loss ratio of the access network is below a preset threshold, etc.

Optionally, in the first preferred embodiment, the processor 72 is further configured to select the target competing group for the accessing user equipment from the competing group according to the demand of the user equipment for the network quality of the access network;

that is, the processor 72 can select a competing group satisfying a preset access overhead condition as the target competing group only according to the access overhead of the competing group into which the access points are grouped by the processor 72; or the processor 72 can select a competing group satisfying both a preset access overhead condition, and the demand of the user equipment for the network quality of the access network as the target competing group according to the access overhead of the competing group into which the access points are grouped by the processor 72, and the demand of the user equipment for the network quality of the access network.

Here the preset access overhead condition can be such that the access overhead is minimum, or the access overhead is below a preset threshold, or lies in a preset threshold range, etc. If there are at least two competing groups, all of which satisfy the preset access overhead condition, then one of the at least two competing groups can be selected randomly as the target competing group.

In the second preferred embodiment, the processor 72 is further configured to select the target competing group for the accessing user equipment from the pre-selected competing group according to the demand of the user equipment for the network quality of the access network; that is, the processor 72 can select a pre-selected competing group satisfying a preset access overhead condition as the target competing group only according to an access overhead of a pre-selected competing group determined by the processor 72; or the processor 72 can select a competing group satisfying both a preset access overhead condition, and the demand of the user equipment for the network quality of the access network as the target competing group according to an access overhead of a pre-selected competing group determined by the processor 72, and the demand of the user equipment for the network quality of the access network.

Here the preset access overhead condition can be such that the access overhead is minimum, or the access overhead is below a preset threshold, or lies in a preset threshold range, etc. If there are at least two pre-selected competing groups, all of which satisfy the preset access overhead condition, then one of the at least two pre-selected competing groups can be selected randomly as the target competing group.

Those skilled in the art shall appreciate that the embodiments of the invention can be embodied as a method, a system or a computer program product. Therefore the invention can be embodied in the form of an all-hardware embodiment, an all-software embodiment or some embodiments of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. An accessing method in a heterogeneous, the method comprises:
   grouping access points, which can serve a user equipment, into at least one competing group; and
   determining an access overhead of each of the at least one competing group, and selecting a target competing group for the accessing user equipment from the at least one competing group according to determined access overhead, the user equipment accessing each of the access points in the target competing group;
   wherein the access overhead of the competing group represents a cost of UE for accessing each of the access points in the competing group.

2. The method according to claim 1, wherein grouping the access points, which can serve the user equipment, into the at least one competing group comprises:
   grouping the access points, which can serve the user equipment, into the at least one competing group under such a principle that access points served by the same operator do not compete with each other, wherein respective access points served by the same operator are grouped into different competing groups; or
   grouping the access points, which can serve the user equipment, into the at least one competing group under such a principle that access points which are operating with the same access technology and served by the same operator do not compete with each other, wherein respective access points which are operating with the same access technology and served by the same operator are grouped into different competing groups; or
   grouping the access points, which can serve the user equipment, into the at least one competing group under such a principle that access points in a preset distance range do not compete with each other, wherein the respective access points in the preset distance range are grouped into different competing groups; or
   grouping the access points, which can serve the user equipment, into the at least one competing group under such a principle that access points operating with the same access technology do not compete with each other, wherein respective access points operating with the same access technology are grouped into different competing groups; or
   grouping the access points, which can serve the user equipment, into the at least one competing group under such a principle that access points where a difference between currently available access rates of each of the access points are above a preset threshold, do not compete with each other, wherein the access points where a difference between currently available access rates of each of the access points are above the preset threshold, are grouped into different competing groups; or
   grouping the access points, which can serve the user equipment, into the at least one competing group under such a principle that access points, which can currently provide such access rates that a difference between each of the access rates and a preset access rate reference value lies in a preset threshold range, shall compete with each other, wherein the access points, which can currently provide such access rates that a difference between each of the access rates and the preset access rate reference value lies in the preset threshold range are grouped into the same competing group; or
   grouping randomly the access points, which can serve the user equipment, into the at least one competing group.

3. The method according to claim 1, wherein before the access overhead of the competing group is determined, the method further comprises: for each competing group, determining access rates to be provided for the user equipment by the respective access points in the competing group respectively, and if all the access rates currently available from the respective access points in the competing group are equal to or greater than the access rates to be provided for the user equipment by the respective access points, then determining the competing group as a pre-selected competing group; and
   determining the access overhead of the competing group, and selecting the target competing group for the accessing user equipment from the competing group according to the determined access overhead comprises: determining an access overhead of each pre-selected competing group, and selecting the target competing group for the accessing user equipment from the pre-selected competing groups according to the determined access overheads.

4. The method according to claim 3, further comprises:
   for each competing group, if the access rate currently available from at least one access point in the competing group is less than the access rate to be provided for the user equipment by the access point, then discarding the competing group.

5. The method according to claim 3, wherein for each competing group, determining the access rates to be provided for the user equipment by the respective access points in the competing group respectively comprises:
   for each competing group, determining the access rates to be provided for the user equipment by the respective access points in the competing group respectively under such a principle that net gains of the respective access points in the competing group are maximized.

6. The method according to claim 1, wherein determining the access overhead of the competing group comprises:
   determining the access overhead of each competing group according to a gain of unit information of the competing group, and access rates to be provided for the user equipment by the respective access points in the competing group.

7. The method according to claim 1, wherein selecting the target competing group for the accessing user equipment from the competing group according to the determined access overhead further comprises:
   selecting the target competing group for the accessing user equipment from the competing group according to a demand of the user equipment for a network quality of an access network.

8. An accessing apparatus in a heterogeneous network, the apparatus comprises:

a grouping module configured to group access points, which can serve a user equipment, into at least one competing group; and a processing module configured to determine an access overhead of each of the at least one competing group, and to select a target competing group for the accessing user equipment from the at least one competing group according to determined access overhead, wherein the user equipment accesses each of the access points in the target competing group;

wherein the access overhead of the competing group represents a cost of UE for accessing each of the access points in the competing group.

9. The apparatus according to claim 8, wherein the grouping module is configured:

to group the access points, which can serve the user equipment, into the at least one competing group under such a principle that access points served by the same operator do not compete with each other, wherein respective access points served by the same operator are grouped into different competing groups; or to group the access points, which can serve the user equipment, into the at least one competing group under such a principle that access points which are operating with the same access technology and served by the same operator do not compete with each other, wherein respective access points which are operating with the same access technology and served by the same operator are grouped into different competing groups; or to group the access points, which can serve the user equipment, into the at least one competing group under such a principle that access points in a preset distance range do not compete with each other, wherein the respective access points in the preset distance range are grouped into different competing groups; or to group the access points, which can serve the user equipment, into the at least one competing group under such a principle that access points operating with the same access technology do not compete with each other, wherein respective access points operating with the same access technology are grouped into different competing groups; or to group the access points, which can serve the user equipment, into the at least one competing group under such a principle that access points where a difference between currently available access rates of each of the access points are above a preset threshold, do not compete with each other, wherein the access points where a difference between currently available access rates of each of the access points are above the preset threshold, are grouped into different competing groups; or to group the access points, which can serve the user equipment, into the at least one competing group under such a principle that access points, which can currently provide such access rates that a difference between each of the access rates and a preset access rate reference value lies in a preset threshold range, shall compete with each other, wherein the access points, which can currently provide such access rates that a difference between each of the access rates and the preset access rate reference value lies in the preset threshold range are grouped into the same competing group; or to group randomly the access points, which can serve the user equipment, into the at least one competing group.

10. The apparatus according to claim 8, wherein the processing module is configured:

for each competing group, to determine access rates to be provided for the user equipment by the respective access points in the competing group respectively, and if all the access rates currently available from the respective access points in the competing group are equal to or greater than the access rates to be provided for the user equipment by the respective access points, to determine the competing group as a pre-selected competing group; and to determine an access overhead of each pre-selected competing group, and to select the target competing group for the accessing user equipment from the pre-selected competing group according to the determined access overhead.

11. The apparatus according to claim 10, wherein the processing module is further configured:

for each competing group, if the access rate currently available from at least one access point in the competing group is less than the access rate to be provided for the user equipment by the access point, to discard the competing group.

12. The apparatus according to claim 10, wherein the processing module is configured:

for each competing group, to determine the access rates to be provided for the user equipment by the respective access points in the competing group respectively under such a principle that net gains of the respective access points in the competing group are maximized.

13. The apparatus according to claim 8, wherein the processing module is configured to determine the access overhead of the competing group by:

determining the access overhead of each competing group according to a gain of unit information of the competing group, and access rates to be provided for the user equipment by the respective access points in the competing group.

14. The apparatus according to claim 8, wherein the processing module is further configured:

to select the target competing group for the accessing user equipment from the competing group according to a demand of the user equipment for a network quality of an access network.

15. A communication device, comprising a transceiver, and at least one processor connected with the transceiver, wherein:

the transceiver is configured to communicate data with another device; and the processor is configured to group access points, which can serve a user equipment, into at least one competing group; and to determine an access overhead of each of the at least one competing group, and to select a target competing group for the accessing user equipment from the at least one competing group according to determined access overhead, wherein the user equipment accesses each of the access points in the target competing group;

wherein the access overhead of the competing group represents a cost of UE for accessing each of the access points in the competing group.

16. The communication device according to claim 15, wherein the processor is configured:

to group the access points, which can serve the user equipment, into the at least one competing group under such a principle that access points served by the same operator do not compete with each other, wherein respective access points served by the same operator are grouped into different competing groups; or to group the access points, which can serve the user equipment, into the at least one competing group under such a principle that access points which are operating with the same access technology and served by the same operator do not compete with each other, wherein respective access points which are operating with the same access technology and served by the same operator are grouped into different competing groups; or to group the access points, which can serve the user equipment, into the at least one competing group under such a principle that access points in a preset distance range do not compete with each other, wherein the respective access points in the preset distance range are grouped into different competing groups; or to group the access points, which can serve the user equipment, into the at least one competing group under such a principle that access points operating with the same access technology do not compete with each other, wherein respective access points operating with the same access technology are grouped into different competing groups; or to group the access points, which can serve the user equipment, into the at least one competing group under such a principle that access points where a difference between currently available access rates of each of the access points are above a preset threshold, do not compete with each other, wherein the access points where a difference between currently available access rates of each of the access points are above the preset threshold, are grouped into different competing groups; or to group the access points, which can serve the user equipment, into the at least one competing group under such a principle that access points, which can currently provide such access rates that a difference between each of the access rates and a preset access rate reference value lies in a preset threshold range, shall compete with each other, wherein the access points, which can currently provide such access rates that a difference between each of the access rates and the preset access rate reference value lies in the preset threshold range are grouped into the same competing group; or to group randomly the access points, which can serve the user equipment, into the at least one competing group.

17. The communication device according to claim 15, wherein the processor is configured:

for each competing group, to determine access rates to be provided for the user equipment by the respective access points in the competing group respectively, and if all the access rates currently available from the respective access points in the competing group are equal to or greater than the access rates to be provided for the user equipment by the respective access points, to determine the competing group as a pre-selected competing group; and to determine an access overhead of each pre-selected competing group, and to select the target competing group for the accessing user equipment from the pre-selected competing groups according to the determined access overheads.

18. The communication device according to claim 17, wherein the processor is configured:

for each competing group, to determine the access rates to be provided for the user equipment by the respective access points in the competing group respectively under such a principle that net gains of the respective access points in the competing group are maximized.

19. The communication device according to claim 15, wherein the processor is configured to determine the access overhead of the competing group by:

determining the access overhead of each competing group according to a gain of unit information of the competing group, and access rates to be provided for the user equipment by the respective access points in the competing group.

20. The communication device according to claim 15, wherein the processor is further configured:

to select the target competing group for the accessing user equipment from the competing group according to a demand of the user equipment for a network quality of an access network.

* * * * *